April 24, 1962 M. C. AGENS 3,031,301

PHOTOSENSITIVE RESIN COMPOSITIONS

Filed March 30, 1959

Inventor:
Maynard C. Agens, by Joseph T. Cohen
His Attorney.

United States Patent Office 3,031,301
Patented Apr. 24, 1962

3,031,301

PHOTOSENSITIVE RESIN COMPOSITIONS

Maynard C. Agens, Schenectady, N.Y., assignor to General Electric Company, a corporation of New York Filed Mar. 30, 1959, Ser. No. 803,012
20 Claims. (Cl. 96—27)

This invention relates to photographic resins possessing depth photosensitivity and thus capable of producing three-dimensional images within said resins. More particularly, this invention relates to photographic compositions capable of producing three-dimensional images in said compositions, comprising an auric salt and a thiourea dissolved in a polymerizable resin medium. Still more particularly, this invention relates to photographic materials capable of producing three-dimensional images therein, said compositions comprising an admixture of (1) a styrene monomer, (2) an ethylenically unsaturated compound copolymerizable with said styrene monomer, (3) a free-radical generating, polymerization catalyst for unsaturated compounds, (4) an auric salt soluble in the admixture of (1) and (2), and (5) a thiourea. This invention also relates to the photographs produced by exposing selected areas of said photosensitive compositions to actinic radiation and completing the polymerization of the admixture and to the process of preparing three-dimensional images within a resin which process comprises: (1) preparing an admixture of (*a*) a styrene monomer, (*b*) an ethylenically unsaturated compound copolymerizable with said styrene monomer, (*c*) a free-radical generating polymerization catalyst for unsaturated compounds, (*d*) an auric salt soluble in the admixture of (*a*) and (*b*), and (*e*) a thiourea; (2) partially polymerizing the composition of (1) to the point of incipient gelation; (3) exposing selected areas of said composition to actinic radiation, and (4) continuing the polymerization process to form a three-dimensional image, comprising gold nuclei within the solid resin.

In my copending application Serial No. 603,568, now Patent 2,949,361, filed August 13, 1956, and assigned to the same assignee as the present invention, I have disclosed how designs and photographs can be made by utilizing the above described photographic compositions without the use of a thiourea. The images so produced, although satisfactory, have one unusual characteristic. If a photographic negative has been used to produce an image such as a portrait, the image will appear as a positive when viewed by transmitted light and as a negative when viewed by reflected light. Unexpectedly I have now found that this phenomenon can be effectively overcome by including a thiourea in my photographic composition. By this improvement, the exposed areas will be blue and an image formed from a photographic negative will appear as a positive image whether viewed by transmitted or reflected light.

The features of the invention desired to be protected herein are pointed out with particularity in the appended claims. The invention itself, together with further objects and advantages thereof, may be understood by reference to the following description taken in connection with the accompanying drawing in which:

Figure 1:
FIG. 1 represents the plan view of the solid piece of resin containing a portrait throughout the depth of an otherwise essentially colorless resin.
Figure 3:
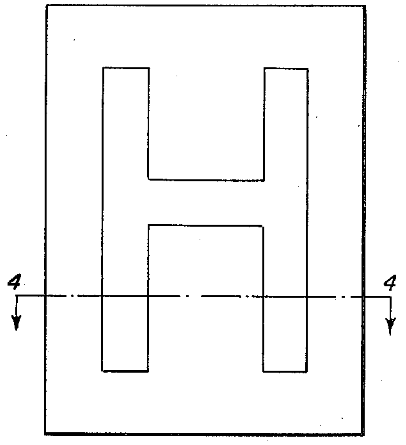
FIG. 3 is a solid piece of resin containing an image of the letter "H" throughout the depth of the otherwise colorless resin. In forming this image, the direction of the rays of actinic radiation were perpendicular to the surface of the resin.
Figure 4:
FIG. 4 is a sectional view on line 4—4 of FIG. 3 showing that the image of the letter "H" is throughout the depth of the resin. In this figure the direction of the image "H" within the resin is perpendicular to the surface of the resin, corresponding to the direction of the rays of actinic radiation used to form the image.
Figure 2:
FIG. 2 is a sectional view on the line 2—2 of FIG. 1 showing that the three-dimensional image is throughout the depth of the resin.
Figure 5:
FIG. 5 is a representation of FIG. 4 as it would appear if the direction of the rays of actinic radiation used to form the image had been at an acute angle to the surface of the resin.
Figure 6:
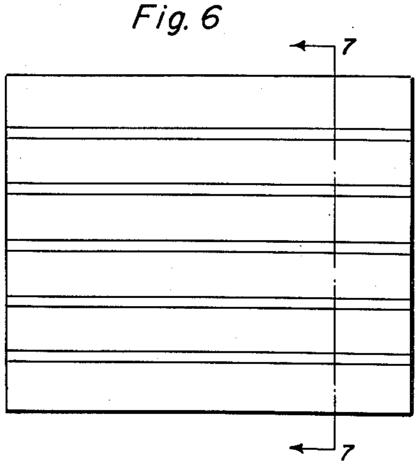
FIG. 6 is a plan view of a solid piece of resin having an image of linear strips prepared in accordance with this invention. Apart from the linear strips, the resin is essentially colorless.
Figure 7:
FIG. 7 is a sectional view on line 7—7 of FIG. 6 showing that the three-dimensional image is throughout the depth of the resin. The direction of the actinic radiation used to form the image was perpendicular to the face of the resin.
Figure 8:
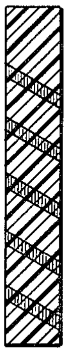
FIG. 8 is a representation of FIG. 7 as it would appear if the direction of the rays of actinic radiation used to form the image had been at an acute angle to the face of the plate.

The spaces between the strips in FIGS. 6, 7, and 8 are essentially colorless and transparent and the strips are of a sufficient width so that they can be used as louvers to block some or all of the light rays which are not transmitted perpendicular to the face of the resin (FIG. 7) or at an angle to the face of the resin (FIG. 8). The angle on these lines can be varied to any suitable angle by changing the direction of the actinic radiation used in forming the image in relation to the face of the resin.

Although the art of photographic resinous materials which depend principally on photosensitive salts for their images is old, all of the heretofore disclosed compositions possessed surface rather than depth photosensitivity. Thus, when the photographic materials containing silver salts, as taught by the prior art, are exposed to actinic radiation, merely a surface image is produced.

I have now discovered compositions which are photosensitive throughout their depth and thus capable of producing images and depth, i.e., a three-dimensional image throughout the depth of the resin as contrasted to a surface effect. These photographic materials comprise an admixture of (1) a styrene monomer, (2) an ethylenically unsaturated compound copolymerizable with said styrene monomer, (3) a free-radical generating, polymerization catalyst for unsaturated compounds, (4) an auric salt soluble in the admixture of (1) and (2), and (5) a thiourea.

The process of this invention comprises: (1) preparing an admixture of (*a*) a styrene monomer, (*b*) an ethylenically unsaturated compound copolymerizable with said styrene monomer, (*c*) a free-radical generating, polymerization catalyst for unsaturated compounds, (*d*) an auric salt soluble in the admixture of (*a*) and (*b*), and (*e*) a thiourea; (2) partially polymerizing the composition of (1) to the point of incipient gelation; (3) exposing selected areas of said partially polymerized composition to actinic radiation; and (4) continuing the polymerization process to form a three-dimensional photographic image, comprising gold nuclei, within the solid resin.

Although the compositions described above are capable of producing images in depth, various modifying agents may be added, preferably in small but significant quantities in the order of 1 percent or less to the composition in order to enhance certain properties. Thus, for example, hydroquinone may be added for enhanced stability, copper salts may be added for enhanced stability and for sharper images, cobalt salts may be added for more accelerated cure and a more stable image, etc.

The resin component of the photosensitive composition comprises: (1) a styrene monomer, or a low molecular weight polystrene capable of further polymerization and (2) an ethylenically unsaturated compound copolymerizable with styrene.

Although unsaturated alkyd resins are preferred as the ethylenically unsaturated compound, other unsaturated compounds which contain at least one vinylidene group, ($CH_2$=C<), and are copolymerizable with styrene may also be employed. Examples are methacrylic and acrylic acid esters, for instance, alkyl esters of methacrylic and acrylic acids (for example, methyl, ethyl, propyl, butyl, decyl, etc. esters); methacrylic and acrylic diesters of alkylene glycols, such as ethylene glycol, polyalkylene glycols, such as diethylene glycol, triethylene glycol, tetraethylene glycol, etc.; alkenyl methacrylates, such as crotyl methacrylate etc.; allyl esters of saturated and unsaturated polycarboxylic acids, for example, diallyl phthalate and diallyl maleate; carboxylic acid esters of vinyl alcohol, for example, vinyl acetate; alkyl esters of unsaturated polycarboxylic acids, for example, dialkyl fumarates and maleates; etc.

Although the ratio of styrene to the unsaturated compound can be varied within wide limits, the copolymer thereby produced should be capable of being controlled so that a gel can be formed which later can be polymerized to a solid. Also, it is desirable to have the admixture fluid enough prior to gelation that it may be readily poured. For example, the percent of styrene used with an alkyd resin can vary between about 20–75 percent or higher, preferably between 30–50 percent based on total weight of the resin composition. Optimum percents will depend on the specific alkyd resin employed. As of present knowledge, it is believed that a styrene monomer is necessary to produce photosensitive compositions of enhanced properties. In addition to styrene itself, alkyl-substituted styrenes, such as those listed in Schildknecht, "Vinyl and Related Polymers," John Wiley and Sons, New York, page 130, Table 1 (1952), and alkoxy ring substituted styrenes such as those listed in the said Schildknecht reference on page 132, Table 3, may also be employed. These styrene monomers are usually liquids which are soluble in the alkyd component.

The alkyd resins (also known as polyesters) copolymerizable with styrene in accordance with this invention are those which contain a plurality of alpha, beta-enal groups, i.e.

$$(-\overset{|}{C}=C-\overset{|}{C}=O)$$

interspersed along the polymer chain. The simplest resins of this group are those resinous polyesters produced by the esterification of an alpha, beta-ethylenically-unsaturated dicarboxylic acid with a polyhydric alcohol.

Among the most useful dihydric alcohols are those which contain either primary hydroxyl groups or secondary hydroxyl groups since they are more readily esterified, with glycols being generally preferable. The particular choice of the glycol is governed by the fact that when it is incorporated into the alkyd resin, the latter should be copolymerizable with styrene to form a gel which can be further polymerized to a solid. Although suitable dihydric alcohols comprise diethylene glycol, dipropylene glycol, triethylene glycol, tetraethylene glycol, etc., the preferable glycols are ethylene glycol, propylene glycol, and mixtures thereof.

Of the dicarboxylic acids, I prefer to use maleic acid. However, other alpha, beta-ethylenically-unsaturated dicarboxylic acids can also be used in preparing the alkyd resins, for example, fumaric, itaconic, citraconic, mesaconic acids, etc. Any of the foregoing acids can be substituted in part with monocarboxylic olefinic acids such as acrylic, methacrylic, cinnamic, etc., acids. Small quantities of tricarboxylic acids as well as trifunctional inorganic acids or esters may also be used. Obviously, mixtures of any of these acids can also be used.

The alkyd resins may be modified with other substances which are often used in alkyd resins, for example, monohydric alcohols, monobasic acids or dibasic acids, for example, phthalic acids, succinic acid, glutaric acid, adipic acid, azelaic acid, sebacic acid, etc., which do not contain groups which are copolymerizable with styrene. These modifying agents are usually used as diluents or plasticizers chemically combined in the resin in a manner so as to improve the mechanical properties of the resins.

The alkyd resins may also be prepared from a controlled amount of polyhydric alcohols other than the glycols or from mixtures including the glycol and controlled amount of the higher polyhydric alcohol, for example, glycerol, pentaerythritol, etc. and may also include a small amount of a monohydric alcohol as a modifier. For example, ethyl, propyl, butyl, etc., alcohols.

It is also possible to introduce into the alkyd resin a certain number of vinylidene groupings ($CH_2$=C<) through the use of olefinic compounds. One way of accomplishing this, for example, is by direct esterification of an unsaturated alcohol containing vinylidene groups. Examples of such alcohols are allyl and methallyl alcohols.

The alkyd resins of this invention may be modified in the same general manner as is well known in the art for the modification of other alkyd resins. However, if a monohydric alcohol or dibasic acid which does not contain polymerizable olefinic groups is used the proportion of such substance should not be so high as to avoid gelation or later solidification. By the use of a relatively large proportion of an olefinic dibasic acid, for example, maleic acid, in the alkyd resin, a harder and tougher polymer is produced upon subsequent polymerization with styrene. On the other hand, if the alkyd resin is obtained from a relatively small proportion of a polymerizable dibasic acid and a relatively large proportion of acids which do not contain groups copolymerizable with styrene, a softer and more flexible resin results from polymerization with styrene. The same effect is produced by the introduction of other inactive ingredients. By varying the ingredients and their proportions, the properties of the resins may be varied to meet the particular requirements of the application. At room temperature the polymerizable alkyd resin is a viscous to semi-solid material. However, the styrene component acts as a solvent to make a flowable liquid.

One of the difficulties in using a polymer composition comprising a styrene monomer and an alpha, beta-ethylenically-unsaturated alkyd resin described above is that it is difficult to store in the mixed form because polymerization may take place even at room temperature within a comparatively short time. Moreover, when it is desired to polymerize these compositions according to this invention, the reaction can become so vigorous that it may be difficult to control. To overcome these difficulties it is advisable to incorporate a small proportion of a polymerization inhibitor in the polymer composition. When it is desired to use the polymer composition, a small percentage of a polymerization catalyst is added, sufficient to overcome the effect of the inhibitor as well as to promote the polymerization. By careful control of the concentrations of inhibitor and catalyst, a suitable gel is obtainable with a good reaction velocity which after exposure can be hardened to a solid polymer.

A wide variety of suitable polymerization inhibitors can be used. Although copper salts, such as copper naphthenate, etc. are preferred because they do not adversely affect the quality of the photographic images, other suitable polymerization inhibitors, such as hydroquinone, etc. can also be employed. It has been found that the combination of hydroquinone and copper salts also makes an excellent inhibitor that does not detract from the quality of the photographic images produced by my process.

The concentration of inhibitor based on weight of resin is preferably low and I have found that less than about 1 percent is usually sufficient. However, I prefer to use only about 0.05 percent to about 0.1 percent, based on weight of total resin composition.

Any of the known free-radical polymerization catalysts for unsaturated compounds may be used. These polymerization catalysts include the organic peroxides, such as hydrocarbon, aldehydic, ketonic and acidic peroxides as well as the corresponding hydroperoxides. Although methylethyl ketone peroxide is preferred, other catalysts comprise the acidic peroxides, e.g. benzoyl peroxide, phthalyl peroxide, succinyl peroxide, etc., as well as mixed peroxides, such as benzoyl (acetyl) peroxide, etc.; the hydroperoxides, e.g. tertiary-butyl hydroperoxide, cumyl hydroperoxide, etc.; the hydrocarbon peroxides, such as di-alpha-cumyl peroxide, etc.

In addition to the peroxides other free-radical polymerization catalysts for unsaturated compounds can also be used either alone or in conjunction with peroxides. Among these catalysts are the acyloins possessing the structure

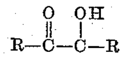

described in U.S. Patent 2,367,661—Agre, such as benzoin, 3-hydroxy-4-methylpentanone-2, butyroin, glycolic aldehyde, etc., aryl acyloins possessing the structure

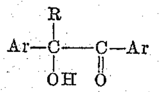

described in U.S. Patent 2,722,512 such as alpha-ethyl benzoins, acyloin ethers possessing the structure

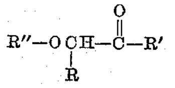

described in U.S. Patent 2,448,828, azo compounds such as "Porofor-N" (alpha,alpha'-azodiisobutyronitrile) alpha,alpha'-azodivaleronitrile, etc., persulfates, perbenzoates, etc.

The concentration of polymerization catalysts employed is usually small, for example about 0.1 part of catalyst per hundred parts of the resin composition to about 2 parts per hundred of the reactive mixture. If an inhibitor is present, up to 5 percent or even more of catalyst may be necessary according to the concentration of inhibitor.

In addition to the polymerization catalysts, suitable catalysts for the decomposition of the peroxides may also be used as polymerization accelerators, for example, cobalt salts, etc.

Cobalt salts are particularly desirable since they may also aid in fixing the image. Although I do not wish to be bound by theoretical considerations, such fixing might occur by two possible mechanisms: (1) by viscosity increase of the plastic, and (2) chemical reaction. Upon exposure to actinic radiation, it is believed that invisible gold nuclei are formed. These nuclei would tend to diffuse quite rapidly if the viscosity of the medium was not sufficient to hold them in place, thus resulting in a fuzzy image or even a complete lack of image. It is believed that one of the roles of the cobalt accelerator is to bring the plastic medium to a high enough viscosity at the point of nuclei formation, as soon as they form, in order to make further diffusion difficult. Although the viscosity is increased by peroxides alone, the use of an accelerator like a cobalt salt further increases the viscosity thus holding these nuclei more firmly in place. It is also believed that the cobalt salts in some way chemically react with any residual unreduced gold salts in the resin in such a way that the gold salt is rendered insensitive to reduction by daylight. In this way, any gold salt remaining in the final product is fixed against further activity.

The function of the thiourea is believed to be related to the nucleation of the gold particles. The exact mechanism of this action of the thiourea is not known since many compounds closely related to the thioureas, such as the thiobarbituric acids and salts of thiocarbamic acid, for example, zinc diethyldithiocarbamate do not provide this stability. Likewise, the presence of thioureas is known to destroy the photosensitivity of silver salts. The thioureas which I may use include thiourea itself and hydrocarbon-substituted thioureas by which term is meant the N-monohydrocarbon, the N,N'-dihydrocarbon, the N,N-dihydrocarbon, the N,N,N'-trihydrocarbon and the N,N,N'N'-tetrahydrocarbon substituted thioureas including cyclothioureas, for example, thioureas having the formula

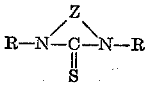

where R is a member of the group consisting of hydrogen and monovalent hydrocarbon groups and Z is a divalent radical having the formula

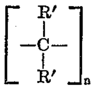

where R' has the same meaning as defined above for R and $n$ has the value 2 and 3. Typical examples of thioureas are: thiourea, N-methylthiourea, N-ethylthiourea, the N-propylthioureas, the N-butylthioureas, the N-decylthioureas, etc., including the cycloaliphatic substituted thioureas, for example, N-cyclohexylthioureas, N-cyclopentylthiourea, including cycloaliphatic thioureas which may have one or more of the ring carbons substituted by a hydrocarbon group, for example, methyl, ethyl, cyclohexyl, tolyl, xylyl, etc., the N-arylthioureas, for example, N-phenylthiourea, N-tolylthiourea, N-xylylthiourea, N-diphenylthiourea, etc., the N,N- and N,N'-disubstituted thioureas, the N,N,N'-trisubstituted and the N,N,N',N'-tetrasubstituted thioureas. The polysubstituted thioureas may be either symmetrical or unsymmetrical. The substituents may be alkyl including cycloalkyl or aryl hydrocarbon, examples of which are the same as those named as examples of the monohydrocarbon substituted thioureas. Typical examples are N,N-dimethylthiourea, N,N'-dimethylthiourea, N,N'-diethylthiourea, the N,N'-diisopropylthioureas, N-methyl-N-ethylthiourea, N-methyl-N'-ethylthiourea, N-methyl-N'-butylthiourea, N-ethyl-N'-cyclohexylthiourea, N-N'-diphenylthiourea, N,N'-ditolylthiourea, N-methyl-N'-phenylthiourea, N-phenyl-N'xylylthiourea, N,N,N'-trimethylthiourea, N-methyl,N-ethyl, N'-phenylthiourea, N,N,N',N'-tetramethylthiourea, etc. Typical examples of the cyclothioureas are N,N'-ethylenethiourea, N,N'-propylenethiourea, N,N'-trimethylenethiourea, N,N'-butylene-1,2-thiourea, N,N'-butylene-1,3-thiourea, N,N-butylene-2,3-thiourea, N,N'dimethyl-N,N'-ethylenethiourea, etc. Because of their ready availability I prefer to use thiourea or N,N'-ethylenethiourea. Nominally the amount of the thiourea used is based on the amount of gold used and is so calculated as to produce a concentration of approximately 1–30 atoms of gold per molecule of the thiourea. The preferred range is 2–10 atoms of gold per molecule of the thiourea. If the gold is present in amounts less than 1 atom of gold per molecule of the thiourea, the resin is apparently not photosensitive.

The presence of a gold salt in these photosensitive compositions is critical for producing the photographic compositions of this invention. Only a very small amount of gold is required in this process, for example, about 0.01 to 0.1 percent, but preferably 0.03 to 0.05 percent calculated as gold based on the rate of total resin. Too little gold decreases the sensitivity and produces very little coloration. On the other hand, an excess of gold seems to have little, if any, effect on photosensitivity over that obtained with the preferred amount. It is believed that among other things one reason for the unusual results obtained from this invention is due to the solubility of the gold salt in the resin composition. Therefore, any gold salt that is soluble in the resinous material is suitable for my process. The gold is preferably introduced into the plastic as gold chloride, preferably in the form of $AuCl_3.HCl._23H_2O$ since it is the most readily available form and is eminently suitable for my process. As will be readily understood all of the ingredients present in the photographic composition should be so selected that they mutually form a homogeneous mixture containing no materials that would interfere with the final photographic image.

The actinic radiation used in this invention which is capable of producing a coloration in the exposed areas while the unirradiated areas remain substantially unchanged are short wave radiations such as that found in the ultraviolet range. Of course, radiation in the fringe areas of visible and infrared are somewhat, although less effective, than those in the ultraviolet range. I can advantageously use radiation having wavelengths of about 2500–5000 angstroms but preferably 3000–4000 angstroms. Any conventional source of this radiation can be employed such as carbon arcs, quartz-mercury arcs, fluorescent lights, etc. The duration of exposure to these radiations necessary to carry out this invention will vary with various factors such as, for example, the intensity of the effective radiation which is related to the source of radiation, its distance from the photosensitive materials, the light transmission of the material used to form the image such as photographic film, glass photographic plates, etc. The light transmission of clear photographic film at 3650 angstroms is about 60 percent while that of clear glass is about 80 percent. When the film bases have on it various densities of silver, this condition reduces the transmission of certain areas of the negative. Because of its relatively high transmission I prefer to use negatives made of glass, particularly ultraviolet transmitting glass. In utilizing photographic negatives, I find it desirable to have the emulsion side up so that it is not in contact with the resin. Other means of producing images can also be used, such as cutout patterns, projection systems, etc.

In order to produce an image of optimum properties such as sharpness of image etc., the state of the resin at the time of exposure is important. During development invsible gold nuclei are formed which agglomerate to form an image. If the liquid resin is exposed to actinic radiation at too early a stage in its polymerization, there is a tendency to get fuzzy, indistinct images due to mobility or shifting of the gold nuclei in the liquid area. If the polymer is too hard due to overpolymerization, there is too little mobility of the gold nuclei and an image is badly underdeveloped since the gold nuclei cannot agglomerate. The best time to start the exposure is just as the polymer is about to gel, i.e., the point of incipient gelation. The state of the incipient gel will be evident to one skilled in the art as that state in which there is low mobility associated with the liquid state and a low degree of rigidness associated with the solid state.

Since the heat of polymerization affects the rate of polymerization, it is advantageous that the heat effect be controlled. Therefore, it is desirable to make the photosensitive polymer of such a cross section that the heat of polymerization is easily dissipated or that the photosensitive polymer is of such even cross section that the heat is dissipated at the same rate over the entire area. The effect of the exotherm is evident when a plastic of uneven cross section (such as one obtains when casting a resin on a watch glass) is exposed to actinic radiation. Because of lesser heat dissipation due to the faster polymerization, the thicker section in the center becomes overheated and further cured than the radial areas and hence the center of the picture comes out badly underdeveloped. Of course, by controlling the intensity of radiation over the various areas of the picture, one can remedy this defect.

This invention may best be understood by reference to the following examples which are presented by way of illustration and not by way of limitation. All parts are by weight in grams unless otherwise indicated.

*Example 1*

An alkyd resin was prepared by reacting 0.75 mole of maleic anhydride, 1.25 moles of phthalic anhydride and 2.1 moles of propylene glycol. These ingredients were placed in a reactor equipped with a stirrer, and nitrogen inlet, and a trap for removing water formed during the reaction. Nitrogen was bubbled through the reaction mixture which was heated at 180–210° C. for 6 hours. During the last half hour the nitrogen flow was increased to remove the last traces of water and unreacted acid. The product after reaction had an acid number of less than 35.

In all of the following examples the polymer composition comprised 30 parts by weight of styrene and 70 parts by weight of the above alkyd resin and will be referred to as "Polymer Composition A."

In a similar manner, "Polymer Composition B" was made except that the alkyd resin was prepared from 1.8 moles of maleic anhydride, 1.0 mole of phthalic anhydride and 3.0 moles of propylene glycol.

The light sensitive material used in the specific examples was gold chloride. It was added to the polymer composition from a stock solution made by dissolving 15 grains of $AuCl_3.HCl.3H_2O$ in 100 grams of monomeric methyl methacrylate (hereinafter called "gold solution").

The catalyst used herein was prepared by dissolving 60 parts of methylethyl ketone peroxide in 40 parts of dimethyl phthalate. This will be referred to as "catalyst solution."

The ethylenethiourea solution was prepared by dissolving 0.1 gram of N,N′-ethylenethiourea in 35 grams of glacial acetic acid, hereinafter called "ethylenethiourea solution."

A water-cooled mercury-arc lamp was used capable of emitting light having a range of wave length from 3000–5000 A. Unless stated otherwise, the light was 10 inches above the surface being exposed. Greater distances would require longer exposures.

The Porofor solution was prepared by dissolving 2.5 grams of alpha,alpha′-azodiisobutyronitrile ("Porofor N") in 50 grams of benzene, hereinafter referred to as "Porofor solution."

Although images may be obtained by using a mixture of (1) a styrene monomer, (2) an alpha, beta-ethylenically-unsaturated alkyd resin copolymerizable with said styrene monomer, (3) a free radical generating polymerization catalyst from unsaturated compounds, (4) a gold salt soluble in the admixture of (1) and (2), and (5) a thiourea, the addition of certain modifying agents or combinations of modifying agents produces improved images. In order to show the effects of modifying agents on images, the basic combination of the five ingredients listed above was modified with (1) polymerization inhibitors for unsaturated compounds such as copper naphthenate and hydroquinone, (2) polymerization accelerators for unsaturated compounds such as cobalt naphthenate.

*Example 2*

The following composition was made:

| | | |
|---|---|---|
| Polymer Composition A | g | 80 |
| Catalyst solution | g | 1 |
| Cobalt solution | cc | 1 |
| Gold solution | cc | 6 |
| Ethylenethiourea solution | cc | 2 |

This composition was placed in a flat glass tray and allowed to stand for a period of about 1 hour by which time it had reached the state of incipient gelation. A photographic negative on glass was placed in contact with the upper surface of the composition. The exposure time was 10 minutes with the mercury arc lamp followed by developing and fixing the image by heating to 65–70°

C. for 1 hour. This produced a positive image when viewed by either reflected or transmitted light.

For improved sensitivity to the mercury arc lamp radiation I have found that it is beneficial to use the peroxide type catalyst in conjunction with Porofor solution. If long stability is not required the benzene in the Porofor solution may be replaced with styrene but such a solution has a very short life due to the formation of styrene polymer. A typical composition using Porofor is shown in the following example.

*Example 3*

| | | |
|---|---|---|
| Polymer Composition A | g | 85 |
| Catalyst solution | g | 1.8 |
| Cobalt solution | cc | 1 |
| Gold solution | cc | 6 |
| Porofor solution | cc | 4 |
| Ethylenethiourea solution | cc | 2 |

This composition required only a 3 minute exposure of the resin to the mercury arc lamp to produce a satisfactory photographic image in contrast to the 10 minute exposure of Example 2 prior to heating as in Example 2.

In addition to the improved positive image as compared to the compositions described in my copending application, I have also found that by using a thiourea I can also reduce the amount of gold necessary in the formulation as shown in the following Example.

*Example 4*

| | | |
|---|---|---|
| Polymer Composition A | g | 85 |
| Catalyst solution | g | 1.8 |
| Cobalt solution | cc | 0.5 |
| Porofor solution | cc | 5 |
| Gold solution | cc | 3 |
| Ethylenethiourea solution | cc | 1 |

This composition was poured into a flat dish. Incipient gelation occurred within about 1 hour after mixing. A photographic negative was placed in contact with the resin and exposed to the mercury arc lamp for 4 minutes followed by heating at 65–70° C. for 1 hour to produce a positive photographic image within the resinous composition.

*Example 5*

| | | |
|---|---|---|
| Polymer Composition B | g | 170 |
| Catalyst solution | g | 1.5 |
| Cobalt solution [1] | cc | 1 |
| Gold solution | cc | 10 |
| Ethylenethiourea solution | cc | 1 |

[1] This cobalt solution contained 7.33 grams of cobalt naphthenate containing 6 percent cobalt dissolved in 100 cc. of styrene.

This solution was placed in a flat glass dish and allowed to stand at room temperature for 1 hour by which time it had reached the incipient gel state. A glass plate having photographic negative on one surface was placed in contact with the resin and exposed for 9 minutes to the mercury arc lamp. An excellent photographic positive print was obtained in the resin after heating for 1 hour at 70–75° C.

*Examples 6, 7, and 8*

Equally good results were obtained by repeating Example 6 but using the following proportions of ingredients and exposures:

| | Example 6 | Example 7 | Example 8 |
|---|---|---|---|
| Polymer Composition B | 85 g | 170 g | 170 g. |
| Catalyst solution | 1.8 cc | 3.6 cc | 1.5 cc. |
| Cobalt solution | 1 cc | 1 cc | 1 cc. |
| Porofor solution | 5 cc | 10 cc | |
| Gold solution | 5 cc | 10 cc | 10 cc. |
| Ethylenethiourea solution | 0.5 cc | 0.5 cc | 0.3 cc. |
| Exposure | 8 min. at 10 in. | 25 min. at 14 in. | 15 min. at 8 in. |

*Example 9*

When Example 5 was repeated but 1 cc. of a thiourea solution prepared by dissolving 0.1 gram of thiourea $$(H_2N-\overset{\overset{S}{\|}}{C}-NH_2)$$

in 35 grams of glacial acetic acid was used in place of the ethylenethiourea, an equally good photographic positive image was obtained in the resin. However, when 1 cc. of thiobarbituric acid solution prepared by dissolving 0.1 gram of thiobarbituric acid solution in 35 grams of glacial acetic acid was substituted for the ethylenethiourea, the picture was dark in all areas and was completely unsatisfactory. Equally unsatisfactory results were obtained when an attempt was made to use 1 cc. of a solution containing 0.1 gram zinc diethyldiethiocarbamate dissolved in 35 grams of glacial acetic acid as a substitute for the ethylenethiourea solution.

In the same manner as illustrated above, a thiourea may be incorporated in any of the compositions of by copending application Serial No. 603,568.

The products of this inventtion are useful in photography, decorating, displaying, etc. They can be used to produce photographs in depth which are of a permanent, storable nature. Since they are very effective when viewed by transparent light, they can be used as decorative panels or murals. Decorative designs can be incorporated into the plastic panels or in thicker sections which can later be machined to the desired shape. The louvers prepared in accordance with this invention can be used as permanently set light directing means for displays, windows, etc.

While the present invention has been described by reference to particular embodiments and examples thereof, variations will readily occur to those skilled in the art. It is, therefore, intended in the appended claims to cover all equivalents as may be obtained in the true spirit of the foregoing description.

What I claim as new and desire to secure by Letters Patent of the United States is:

1. A photosensitive composition capable of producing a three-dimensional photographic image, which comprises the product produced by partially polymerizing to the incipient gel state a composition comprising (1) a styrene monomer selected from the group consisting of styrene, alkyl ring-substituted styrenes, and alkoxy ring-substituted styrenes, (2) a compound copolymerizable with said styrene monomer, which is selected from the group consisting of compounds containing at least one $CH_2=C<$ group and liquid, resinous polyesters of an ethylenically unsaturated dicarboxylic acid and a polyhydric alcohol, (3) a free-radical generating, polymerization catalyst for unsaturated compounds, (4) an auric salt soluble in the admixture of (1) and (2), and (5) a urea selected from the group consisting of thiourea and hydrocarbon-substituted thioureas.

2. The solid resinified composition of claim 1 containing within its depth a three-dimensional image comprising gold nuclei and exhibiting photographic detail.

3. A photosensitive composition capable of producing a three-dimensional photographic image, which comprises the product produced by partially polymerizing to the incipient gel state a composition comprising (1) a styrene monomer selected from the group consisting of styrene, alkyl ring-substituted styrenes, and alkoxy ring-substituted styrenes, (2) at least one liquid, resinous polyester of an ethylenically unsaturated dicarboxylic acid and a polyhydric alcohol copolymerizable with said styrene monomer, (3) a free-radical generating, polymerization catalyst for unsaturated compounds, (4) an auric salt soluble in the admixture of (1) and (2), and (5) a urea selected from the group consisting of thiourea and hydrocarbon-substituted thioureas.

4. The solid, resinified composition of claim 3 containing within its depth a three-dimensional image comprising gold nuclei and exhibiting photographic detail.

5. A photosensitive composition capable of producing a three-dimensional photographic image, which comprises the product produced by partially polymerizing to the incipient gel state a composition comprising (1) a styrene monomer selected from the group consisting of styrene, alkyl ring-substituted styrenes, and alkoxy ring-substituted styrenes, (2) at least one liquid, resinous polyester of an ethylenically unsaturated dicarboxylic acid and a polyhydric alcohol copolymerizable with said styrene monomer, (3) a peroxide, (4) an auric salt soluble in the admixture of (1) and (2), and (5) a urea selected from the group consisting of thiourea and hydrocarbon-substituted thioureas.

6. The solid, resinified composition of claim 5 containing within its depth a three-dimensional image comprising gold nuclei and exhibiting photographic detail.

7. The photosensitive composition of claim 5 wherein the thiourea is N,N'-ethylenethiourea.

8. The solid resinified composition of claim 7 containing within its depth a three-dimensional image comprising gold nuclei and exhibiting photographic detail.

9. The composition of claim 5 wherein the thiourea is thiourea itself having the formula $$H_2N-\overset{\overset{\displaystyle S}{\|}}{C}-NH_2$$

10. The solid resinified composition of claim 9 containing within its depth a three-dimensional image comprising gold nuclei and exhibiting photographic detail.

11. The method of preparing three-dimensional photographic images within a resin which comprises (1) preparing an admixture of (*a*) a styrene monomer selected from the group consisting of styrene, alkyl ring-substituted styrenes, and alkoxy ring-substituted styrenes, (*b*) at least one liquid, resinous polyester of an ethylenically unsaturated dicarboxylic acid and a polyhydric alcohol copolymerizable with said styrene monomer, (*c*) a free-radical generating, polymerization catalyst for unsaturated compounds, (*d*) an auric salt soluble in the admixture of (*a*) and (*b*), and (*e*) a urea selected from the group consisting of thiourea and hydrocarbon-substituted thioureas; (2) partially polymerizing the composition of (1) to the point of incipient gelation; (3) exposing selected areas of said partially polymerized composition to actinic radiation; and (4) continuing the polymerization process until a three-dimensional photographic image comprising gold nuclei is developed within the solid resin.

12. A method of preparing three-dimensional photographic images within a resin which comprises (1) preparing a mixture of (*a*) a styrene monomer selected from the group consisting of styrene, alkyl ring-substituted styrenes, and alkoxy ring-substituted styrenes, (*b*) at least one liquid, resinous polyester of an ethylenically unsaturated dicarboxylic acid and a polyhydric alcohol copolymerizable with said styrene monomer, (*c*) a free-radical generating, polymerization catalyst for unsaturated compounds, (*d*) a polymerization accelerator, (*e*) an auric salt soluble in the admixture of (*a*) and (*b*), and (*f*) a urea selected from the group consisting of thiourea and hydrocarbon-substituted thioureas; (2) partially polymerizing the composition of (1) to a point of incipient gelation; (3) exposing selected areas of said partially polymerized composition to actinic radiation; and (4) continuing the polymerization process until a three-dimensional photographic image comprising gold nuclei is developed within the solid resin.

13. The method of preparing three-dimensional photographic images within a resin which comprises (1) preparing a mixture of (*a*) a styrene monomer selected from the group consisting of styrene, alkyl ring-substituted styrenes, and alkoxy ring-substituted styrenes, (*b*) at least one liquid, resinous polyester of an ethylenically unsaturated dicarboxylic acid and a polyhydric alcohol copolymerizable with said styrene monomer, (*c*) a peroxide, (*d*) a cobalt salt, (*e*) an auric salt soluble in the admixture of (*a*) and (*b*), and (*f*) a urea selected from the group consisting of thiourea and hydrocarbon-substituted thioureas; (2) partially polymerizing the composition of (1) to the point of incipient gelation; (3) exposing selected areas of said partially polymerized composition to actinic radiation and (4) completing the polymerization process until a three-dimensional photographic image comprising gold nuclei is developed within the solid resin.

14. The method of claim 13 wherein the thiourea is N,N'-ethylenethiourea.

15. The method of claim 13 wherein the thiourea is thiourea itself having the formula $$H_2N-\overset{\overset{\displaystyle S}{\|}}{C}-NH_2$$

16. The photosensitive composition of claim 5 wherein the styrene is styrene itself.

17. The solid resinified composition of claim 16 containing within its depth a three-dimensional image comprising gold nuclei and exhibiting photographic detail.

18. A photosensitive composition capable of producing a three-dimensional photographic image, which comprises the product produced by partially polymerizing to the incipient gel state a composition comprising (1) styrene, (2) at least one liquid, resinous polyester of an ethylenically unsaturated dicarboxylic acid and a polyhydric alcohol copolymerizable with said styrene, (3) a peroxide, (4) an auric salt soluble in the admixture of (1) and (2), and (5) N,N'-ethylene thiourea.

19. The solid resinified composition of claim 18 containing within its depth a three-dimensional image comprising gold nuclei and exhibiting photographic detail.

20. The method of preparing three-dimensional photographic images within a resin which comprises (1) preparing an admixture of (*a*) styrene, (*b*) at least one liquid, resinous polyester of an ethylenically unsaturated dicarboxylic acid and a polyhydric alcohol copolymerizable with said styrene, (*c*) a peroxide, (*d*) an auric salt soluble in the admixture of (*a*) and (*b*), and (*e*) N,N'-ethylene thiourea, (2) partially polymerizing the composition of (1) to the point of incipient gelation, (3) exposing selected areas of said partially polymerized composition to actinic radiation, and (4) continuing the polymerization process until a three-dimensional photographic image comprising gold nuclei is developed within the solid resin.

References Cited in the file of this patent

UNITED STATES PATENTS

| | | |
|---|---|---|
| 2,515,937 | Stookey | July 18, 1950 |
| 2,673,151 | Gerhart | Mar. 23, 1954 |
| 2,760,863 | Plambeck | Aug. 28, 1956 |
| 2,875,047 | Oster | Feb. 24, 1959 |
| 2,949,361 | Agens | Aug. 16, 1960 |